United States Patent [19]

Menezes

[11] Patent Number: 4,922,468

[45] Date of Patent: May 1, 1990

[54] METHOD AND APPARATUS FOR CONTROLLING AQUATIC POPULATION IN DEFINED AREAS

[75] Inventor: John K. Menezes, East Lyme, Conn.

[73] Assignee: Sonalysts, Inc., Waterford, Conn.

[21] Appl. No.: 360,478

[22] Filed: Jun. 2, 1989

[51] Int. Cl.⁵ .............................................. H04B 1/02
[52] U.S. Cl. ..................................... 367/139; 367/111; 116/22 A
[58] Field of Search ........................ 367/139, 87, 111; 119/3; 116/22 A; 340/384 A, 384 B; 43/17.1, 124

[56] References Cited

U.S. PATENT DOCUMENTS

| | | | |
|---|---|---|---|
| 3,414,873 | 12/1968 | Richard et al. | 367/139 |
| 3,802,109 | 4/1974 | Stein . | |
| 3,872,472 | 3/1975 | Moschgat | 340/384 E |
| 3,879,697 | 4/1975 | Richard . | |
| 4,001,817 | 1/1977 | Squires | 340/384 E |
| 4,105,992 | 8/1978 | Luciano | 367/139 |
| 4,186,387 | 1/1980 | Muschgat | 367/139 X |
| 4,439,844 | 3/1984 | Menin | 367/87 |
| 4,538,249 | 8/1985 | Richard . | |
| 4,563,759 | 1/1986 | Hayakawa | 367/139 |
| 4,646,276 | 2/1987 | Kowaleski et al. | 367/139 |
| 4,658,386 | 4/1987 | Morris | 367/139 |

Primary Examiner—Thomas H. Tarcza
Assistant Examiner—Tod Swann

[57] ABSTRACT

A method for controlling the population of marine and aquatic species in an area of water includes the development of data concerning the response of various species to stimuli in different environmental conditions, and the generation of stimuli in the control area to affect the species in that area and thus control the population. The stimuli are generally sonic waves, but other stimuli such as light, radio waves, and magnetism may also be employed in place thereof or in addition thereto. The system uses a feedback monitor and computer with data concerning species response to adapt the stimuli to changing species and conditions.

25 Claims, 4 Drawing Sheets

METHOD AND APPARATUS FOR CONTROLLING AQUATIC POPULATION IN DEFINED AREAS

BACKGROUND OF THE INVENTION

The present invention is directed to novel methods and apparatus for controlling the population of fish, aquatic mammals, and the like in a defined area of a body of water.

It is known that sound and other stimuli can cause voluntary and involuntary movement in marine and aquatic creatures. It has heretofore been suggested that sonic waves could be utilized to drive fish away from water intakes, and to attract fish into areas where they could be netted. However, so far as is known, such procedures have not proven effective because different species of fish will respond differently to the same stimuli, and the same species may respond differently to the same stimulus under different environmental conditions, e.g., water temperature, time of day, etc.

It will be appreciated that effective use of stimuli to control marine population is a given area of a body of water could have constructive, protective applications by deterring marine and aquatic organisms from dangerous or undesirable areas, such as water intakes and sites of chemical discharges, or by attracting them to more desirable areas such as fish ladders and bypasses around water intakes.

As used herein, the term "marine creatures" or "marine species" refers to fish, crustaceans, and other non-mammalian species which are resident in water and which are self-propelling and responsive to external stimuli. The term "aquatic creature" or "aquatic species" refers to mammals which reside in the water such as dolphins, seals, manatees and sea lions, and to birds and other animals which swim and dive below the surface of the water such as beavers, and muskrats.

As used herein, the term "stimuli" is intended to encompass a single stimulus and multiple stimuli, whether sequentially or simultaneously generated, and which may have the effect of attracting or repelling a subject species.

Sensitivity to potential stimuli such as sound, light, heat, and chemicals is species-specific and depends on biological form, structure, and function. Less well known are animal sensitivities to magnetism, electrical fields, radio frequency waves, and gravity. For a single species, sensitivity to a given stimulus may be affected by environment, instinct, conditioning, or unknown factors. The response of a subject species to a stimulus which it senses may also be dependent on these factors. Does the subject species sense the stimulus as an irritant, a noise (referring to background or interfering levels of the stimulus), or a signal. If it is interpreted as a signal, does the species consider it to signify danger, safety, food, a predator, or something else? Observable animal responses to stimuli include startle (a sudden, but not necessarily directional movement); avoidance (motion away from the source); and attraction (motion toward the source). As the ability to accurately generate and detect species response to stimuli increases, the ability to use these stimuli to constructively influence the movement of marine and aquatic species is increased.

A stimulus that generates a response during daylight may be ineffective at night. An effective stimulus or pattern of stimuli which is repeated may become ineffective if the subject becomes acclimated to it. A stimulus that is too strong may disorient the subject species or incapacitate it. Some species may be unable to discern a sonic stimulus which is below the level of background noise; additionally, levels of background noise fluctuate, requiring changes in relative and absolute signal strength.

Attempts to influence the behavior of marine and aquatic organisms such as fish by use of acoustic, photic, electrical, and mechanical energy have been pursued in the past. Many of the devices used to produce underwater sound employed mechanical or electromechanical sources such as bells, chains, drums, pipes, plates, or pneumatic "poppers". Other devices have employed electrical sources of sound, such as audio-magnetic tape players connected to underwater speakers or simple signal oscillators and transducers. Usually, these devices were employed to transmit sounds which were intended to irritate fish.

In some cases, investigators seeking to repel fish selected a sound which they, as humans, found annoying. In one case, the sounds included "rock music" and the sound of a "video arcade game"; the investigators apparently assumed that the fish would also find these sounds annoying. These well-intending, somewhat anthropomorphic efforts reflect neither the current state of the art in underwater signal generation nor consideration of the sensory perception of individual marine and aquatic species. If these sounds are at all detectable by fish, there is a logical probability that some species will be attracted by the sounds, that some will find them repulsive, and that some will ignore them. These acoustic efforts are probably indicative of efforts to attract or repel fish using other forms of energy as well.

More recently, the effects of discrete acoustic signals (used alone or in combination with lights or other stimuli) on individual fish species have been studied. While this research indicates that the behavior of some species of fish and aquatic mammals can be influenced by certain sounds, the results are not comprehensive and are of inconclusive value in field applications. These studies did not employ high sound source levels (more than 180 decibels referenced to 1 micropascal per Hertz measured in the water one yard from the source), broad band frequencies (from less than 10 Hertz (Hz) to more than 190 kiloHertz (kHz)), or a high degree of signal complexity and fidelity achievable with larger and more costly underwater sound generation systems.

The need to develop reliable methods to influence the movement of marine and aquatic animals is assuming increased importance in the protection of commercially valuable and ecologically significant marine and aquatic species. Scientific, public, and legislative awareness of issues in protecting the ecology are driving requirements for mitigation of the harmful impacts of water intake, discharges, dredging, and other human activities on marine and aquatic species. Temporal mitigation is not always feasible, and mechanical barriers can be expensive to install and maintain.

It is an object of the present invention to provide a novel, effective and relative harmless method for controlling the population of marine and aquatic species in a limited area of a body of water.

It is also an object to provide such a method in Which there is monitoring of the relationship between species-specific sensitivity and the effectiveness of the stimuli employed.

Another object is to provide such a method in which there is adaptive modification and automatic change of generated sound, light, and other signals to reflect predicted and measured changes in environment and species abundance.

Still another object is to provide novel apparatus for conducting such methods and for accurately monitoring the performance of the system.

A further object is to provide such apparatus in which various combinations of stimuli may be automatically started, electronically modified, and stopped.

A still further device is to provide a practical apparatus with sufficient power and flexibility to have use in the field for protective purposes.

SUMMARY OF THE INVENTION

It has now been found that the foregoing objects and advantages may be readily attained in a method and apparatus for controlling that population in defined areas in a body of water. The presence of marine and aquatic creatures is initially determined in the water in the area to be controlled. Stimuli to which the species is responsive are generated in the water within the area to affect the population of the species in the area.

Preferably, the area is initially monitored to determine the species which populate the area, and the stimuli to effect the desired movement of such species are predetermined. The generated stimuli utilize the predetermined stimuli. Preferably, the population of species in the area is dynamically monitored to determine the effectiveness of the generated stimuli, and the generated stimuli are varied based upon the feedback from such monitoring until the desired effect is obtained upon the monitored species.

Most usually, the stimuli cause the species to depart the area, and the stimuli are sonic waves which may comprise a combination of signals of different frequencies. The intensity or amplitude of the waves may also be varied. Moreover, a multiplicity of different stimuli may be generated to affect multiple species.

The apparatus includes means for monitoring the presence of species of marine and aquatic creatures in the water in the area to be controlled, and means for generating stimuli in the water in the area to affect the population of the monitored species in the area. There are also included means for evaluating the effectiveness of generated stimuli, and means for varying the stimuli until a desired effect on the population of the species is obtained.

Generally, the stimuli generating means includes a transducer and drive means for generating pulses of energy to the transducer to produce sonic waves in the water. Preferably, the drive means is variable to vary the frequency of the sonic waves and to vary the intensity or direction of the sonic waves. Multiple transducers and multiple drive means may be utilized for producing sonic waves of different frequency in the water in the area, and the transducers may be disposed in spaced apart locations.

The apparatus will desirably include programmable control means for the other means including a data storage device containing stored data on multiple species of marine and aquatic creatures likely to be found in the area, and known information as to the effectiveness of various stimuli on such multiple species and as to environmental variables affecting the effectiveness of such stimuli on the species. The control means will also include software for analyzing the stored data and the input from the monitoring means to change automatically the generated stimuli. Desirably, there is also included sensing means for determining environmental conditions in the water in the area.

Thus, this invention may effectively use integrated circuitry and computer programmable algorithms to automatically or manually control the synthesis, reproduction, and generation of electronic signals which are converted to underwater acoustic energy by powerful and rugged underwater transducers, or converted to other forms of user-designated stimuli such as light or radio frequency waves by other types of emitters. The method and apparatus of the present invention are adaptive and can alter and combine multiple stimuli transmission characteristics in response to predicted or observed changes in environmental conditions or in the monitored species.

Accordingly, the present invention constructively exploits the effects which acoustic energy and other stimuli can have on the movement of marine and aquatic species. Acoustic energy is used as the principal stimulus because of the excellent propagation of sound underwater, its known effects on many marine and aquatic species, and the existing ability to design and build sufficiently powerful acoustic transducers and associated equipment. However, the system is also capable of controlling signals emitted as other forms of energy which presently exhibit less desirable propagation in water, or which have less well known effects on marine and aquatic organisms. Such other stimuli include light, heat, electrical fields, radio frequency waves, magnetism, and gravity.

As indicated, the apparatus can be set to electronically generate a practically infinite variety of "sounds" that can be transmitted at different frequencies, different sound levels or intensities, different pulse lengths, and different intervals so that each parameter is variable from a minimum to a maximum. Sounds can be generated in simple or complex patterns or reproduced from prerecorded media. In addition, the system is capable of electronically focusing the acoustic energy (beam forming) and steering it on a particular bearing, or along a selected angle of depression or elevation. Moreover, the transmitted signal parameters reside in software and can be changed by automatic or manual reprogramming.

DETAILED DESCRIPTION OF PREFERRED EMBODIMENT OF THE INVENTION

Figure 1:
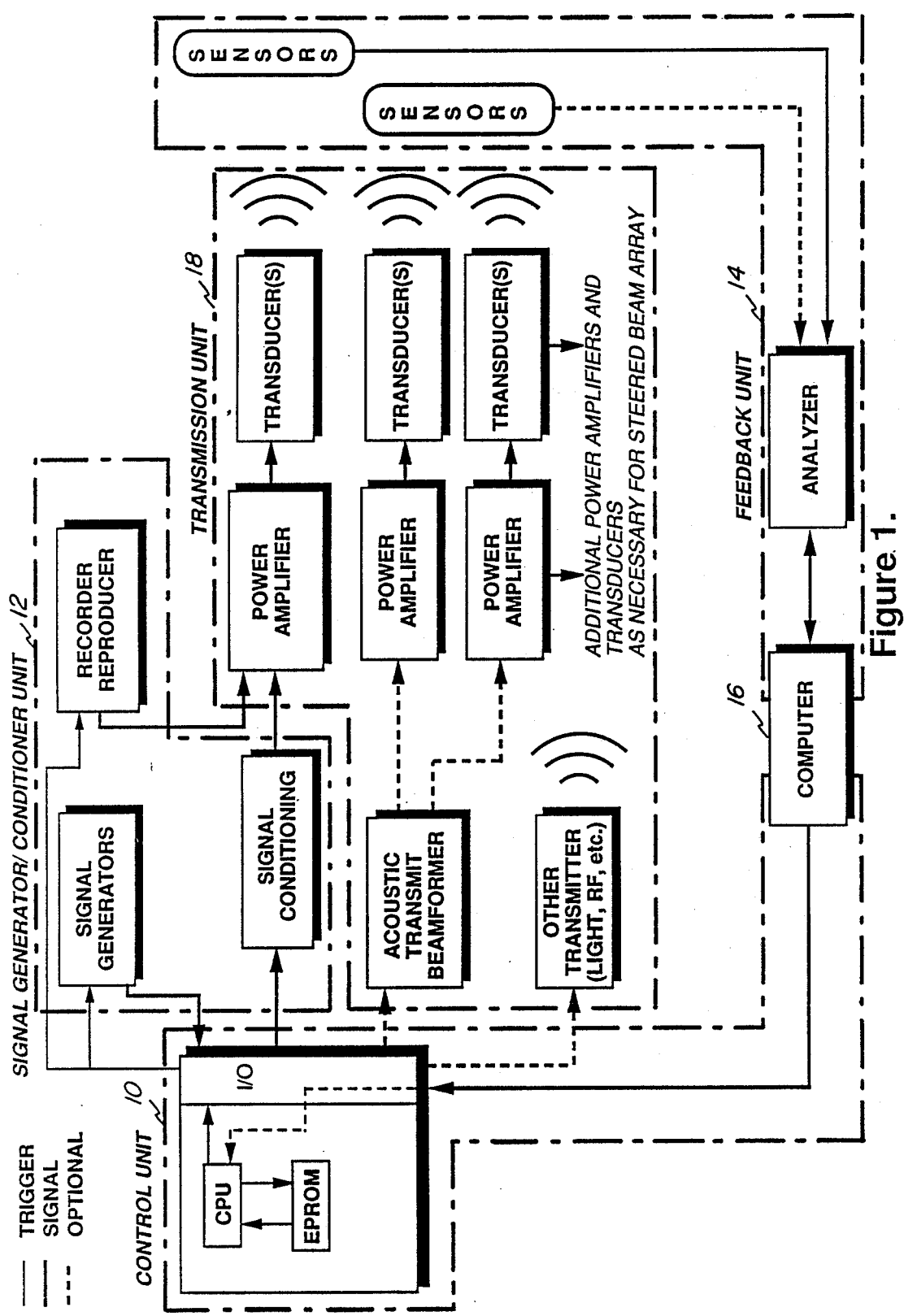
FIG. 1 is a diagrammatic illustration of the components of a population controlling system embodying the present invention.

Turning first to FIG. 1, therein diagrammatically illustrated is apparatus embodying the present invention and generally comprised of a control unit 10, a signal generator unit 12, a feedback unit 14, and a transmission unit 18.

The control unit 10 includes a central processor (CPU) 20 and input/output devices 22 and a display (not shown). The CPU 20 is an integrated circuit processor and contains an erasable Preprogrammed Read Only Memory (EPROM) 26 which contains parameters and instructions for evaluating, setting and triggering signal generation. The input/output card (I/0) 22 controls signal communications and protects the CPU 20 from external components and peripheral circuitry. The control unit 10 typically provides instructions for at least four pulse lengths (e.g., 10, 20, 60, and 100 milliseconds) and at least four repetition rates (e.g., 1, 3, or 5 seconds, or random length pulses at intervals between 1 and 8 seconds).

The instructions from the control unit trigger the generation of a stimulus using one or more signal generators in the signal generator unit 12. The CPU output is desirably compatible with transistor-transistor logic (TTL) providing a +5 volt DC signal for the duration of a signal. The control unit 10 is capable of controlling the signal generator unit 12 to produce not only sound, but also light and other stimuli.

In its simplest configuration, the apparatus of the present invention is capable of operating with a control unit 10 that contains a single Z80 processor. However, additional or more powerful processors can be inserted into the control unit CPU 20 to expand the combinations of signal instructions in memory, and the control unit EPROM 26 may also be reprogrammed by a separate computer 16 which consists of a separate CPU, keyboard, readable and programmable memories, communications modem, display, and input/output devices. The computer 16 is used to write new instructions to the EPROM 26 of the control unit (from manual entries, program software, or feedback sensors). The computer 16 can also be used to supplement the feedback and signal processing capabilities of the CPU 20 in the control unit 10; to record transmission and feedback data; to send data to a device such as a modem or plotter; and to conduct system self-test routines. The computer 16 can be permanently or temporarily installed depending upon the complexity of site-specific requirements.

Figure 2:
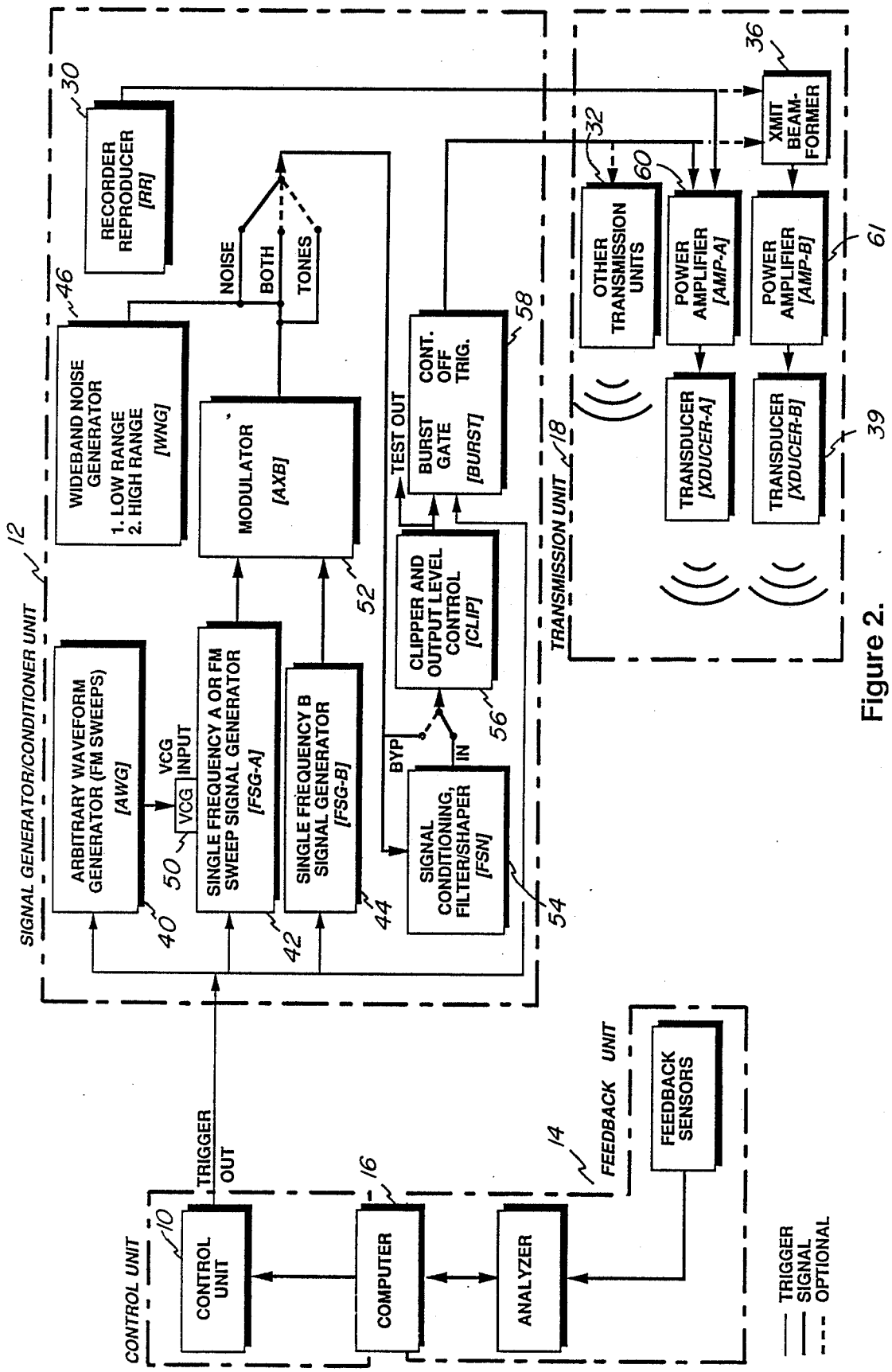
FIG. 2 is a diagrammatic detailed illustration of the components of the stimulus generating section of the system.

Output from the control unit 10 is fed to a triggering circuit TRIG and then to the signal generator 12 which is illustrated in detail in FIG. 2. BNC-to-BNC to connectors and shielded cable are used to prevent unwanted signal components from being introduced.

As seen in FIG. 1, the signal generator 12 may include a recorder/reproducer 30, and there may be one or more other types of stimulus generators 32 as well as transducers 34 to generate sonic waves. As seen, the signal from the control unit 10 may also be directed to an acoustic beam transformer 36 which controls the power amplifiers 38 which amplify the signal to the transducers 39.

As seen in FIG. 2, the sound generation and reproduction components include an arbitrary wave generator (AWG) 40, two variable frequency signal generators (FSG-A and FSG-B) 42, 44, a wideband noise generator (WNG) 46, and a recorder/reproducer (R/R) 30.

The arbitrary wave generator 40 (e.g., Wavetek 75) is used during frequency modulated (FM) sweep generation, and it generates a direct current up- or down-ramp that sweeps one variable frequency signal generator frequency range, producing an FM sweep (a signal with a rising or decreasing frequency). The arbitrary wave generator 40 generates four different waveforms (ramps) to satisfy the FM sweep modes, and a separate ramp is used for each pulse length. Output from the wave generator 40 is input to the voltage controlled generator (VCG) 50 of frequency signal generator 42.

The variable frequency signal generators 42, 44 (e.g., Wavetek 188) can be used singly to generate one frequency or to generate FM sweeps. In the single frequency mode, the Voltage Controlled Generator 50 is not used. The signal generators 42 and 44 can also be used in combination to develop sequential, simultaneous, or amplitude modulated (AM) signals. During FM sweeps, only the signal generator 42 is used.

The signal generators 42 and 44 can pass output to an amplitude modulator (AXB) 52 which would only process signals when amplitude modulation is desired; signals from either signal generator 42,44 are used as a carrier. All tones are passed from the modulator 52 to the filter shaping network 54. Signal generators 42 and 44, and the modulator 52 are not used during wideband noise generation or playback of recorded sounds.

Conveniently, the wideband noise generator (WNG) 46 produces wideband noise at least from 10 Hz to 20 kHz, but an expanded frequency range 5 Hz to 40 kHz is preferably employed. Output from the noise generator 46 can be fed to the signal conditioning filter shaping network (FSN) 54 to limit the noise spectra to band widths of 100 to 500 Hz. Without band limiting, excessive power might be consumed in amplifying signals at frequencies above and below the optimal or selected range of the transmitter. In addition to improving the efficiency and increasing the maximum source level of the signal generation system, the network filter 54 spectrally alters the transmitted electrical signal to compensate for non-uniform transmit characteristics of the transmitter and to provide a spectrally flat signal in the water.

As will be appreciated, the filter shaper network (FSN) 54, in conjunction with the acoustic transducers, transmits voltage response and provides a flat broad band sound spectrum in the water by compensating for transducer response at different frequencies. For example, signals are reduced at frequencies of high transducer transmitting response and increased at frequencies of low transducer transmitting response. The result is a flat output spectral response in the water.

Selection of tone and noise operation is achieved by electronic switching, and switching is also used to send the signals through the desired signal shaping network.

Shaped or unshaped noise and tones are passed to clipper (CLIP) 56 which limits power requirements and limits potentially harmful peak current and voltage excursions before the signals are passed to the power amplifier or transmission unit. A level control and output monitor provided in the CLIP output can be adjusted either manually or electronically.

The signals from CLIP 56 are routed to burst gate (BG) 58, which controls when signals are transmitted. Tones or noise are routed from the burst gate 58 to the transmission unit 18 for amplification and emission.

As indicated, recorded signals can be reproduced using a separate recorder/reproducer (R/R) 30. In a prototype system, a standard audiocassette deck with a frequency response from 20 Hz to 20 kHz was used to reproduce natural and predator underwater sounds. A high speed recorder/reproducer should be used when higher frequencies up to 180 kHz are to be reproduced.

Other signal patterns and signal instructions can be created or recorded, stored on magnetic or laser read/write media, and passed to the appropriate transmission unit for amplification and emission.

The transmission unit 18 consists of one or more sets of signal amplifiers and emitters. As illustrated, there is required one acoustic power amplifier (AMP-A) 60, and one transducer (XDUCER-A) 34. More transducers can be added; other sets of transducers and amplifiers can be added; and other types of transmitters can be substituted or added with the requisite power amplification equipment. Because of this flexibility, centrally located control and signal generation units can serve multiple transmitters arranged to cover large or complex operation areas, or transmitters operating at distant/remote sites.

Power amplifier (AMP-A) 60 (e.g., Instrument Incorporated LB-6) typically increases the output level to a maximum of 2000 volt amperes for pulsed operation (typically 1-second for a 10% duty cycle) or to 800 volt amperes for continuous operation. More powerful or additional amplifiers and transducers can be added to achieve higher output levels, to electronically focus the acoustic energy, or to accommodate light, radio frequency, or other types of emitters.

For underwater sound transmission, the amplified signal from amplifier 60 is passed to underwater transducer (XDUCER-A) 34, which is capable of producing sound at levels which are sufficient to be detected by the subject species above the background noise at sufficient ranges. The choice of the specific transducer(s) used is range, frequency, and site dependent. The transmission unit 18 is expandable to accommodate additional transducers and amplifiers, as noted above, as well as transmit beamformer 36. This expandability provides increased acoustic source levels and allows the acoustic energy to be electronically focused or steered in a particular bearing and depression/elevation angle.

The requirement for increased source levels, beamforming, steering, or other means of focusing the acoustic energy is site dependent; comparable results can not always be achieved by changing the spatial deployment and orientation of the transducers. Use of multiple transducers can provide higher source levels without cavitation which disrupts signal integrity and eventually damages transducer components, but this is not always feasible from cost and engineering standpoints. The receive hydrophone in the feedback unit 14 (to be described hereinafter) may be used to make the present invention useful as a site-specific engineering tool. Site requirements and fixed and variable signal propagation characteristics can be measured and compensated in the electronic circuitry.

The apparatus should employ transducers to produce adequate sound levels across the full range of frequencies in which responses might be expected from marine and aquatic species. In studies conducted with a prototype unit, it was found that signals of up to 200 dB//uPa/Hz at 1 meter distance may be required at frequencies ranging from less than 10 Hz to more than 180 kHz to elicit a favorable response from species such as blueback herring (*Pomolobus estivalis*), white perch (*Morone americana*), and striped bass (*Morone saxatilis*). Background noise levels alone often exceeded 120 dB//uPa/Hz during preliminary field studies. Requisite levels can be achieved across the range of frequencies by using three transducers as follows:

Low frequency (<10 Hz to approximately 200 Hz) (e.g., Hydroacoustics Inc. Model HLF-6)
Medium frequency (100 Hz to approximately 100 kHz) (e.g., Honeywell Model HX-29)
High frequency (100 kHz to more than 180 kHz) (e.g., ITC Model 3003).

Other transducers can be substituted for the ones named above, but they must be capable of producing the requisite signals at the desired frequencies and amplitudes. It is conceivable that improvements in material and conductor technology will provide single transducers capable of covering or extending these amplitude and frequency ranges.

Beam patterns of sound generated by modern underwater acoustic transducers can be highly focused in one direction or relatively uniformly distributed in all directions. Directivity of a single transducer is largely a function of its shape, size, composition, construction, and the frequency range it was designed to generate. These functions are not readily adjustable in most field installations where it may be necessary to refocus a majority of the acoustic energy in one direction, cancel sound transmitted in one direction, or achieve omnidirectional coverage as frequencies and requirements vary. Typically, these requirements have been met by installing multiple transducers or by mechanically steering the transducers. While this can also be done with the present invention, a beamforming unit (XBMF) 36 has been incorporated to electronically steer the acoustic energy generated by as few as two transducers.

Figure 3:
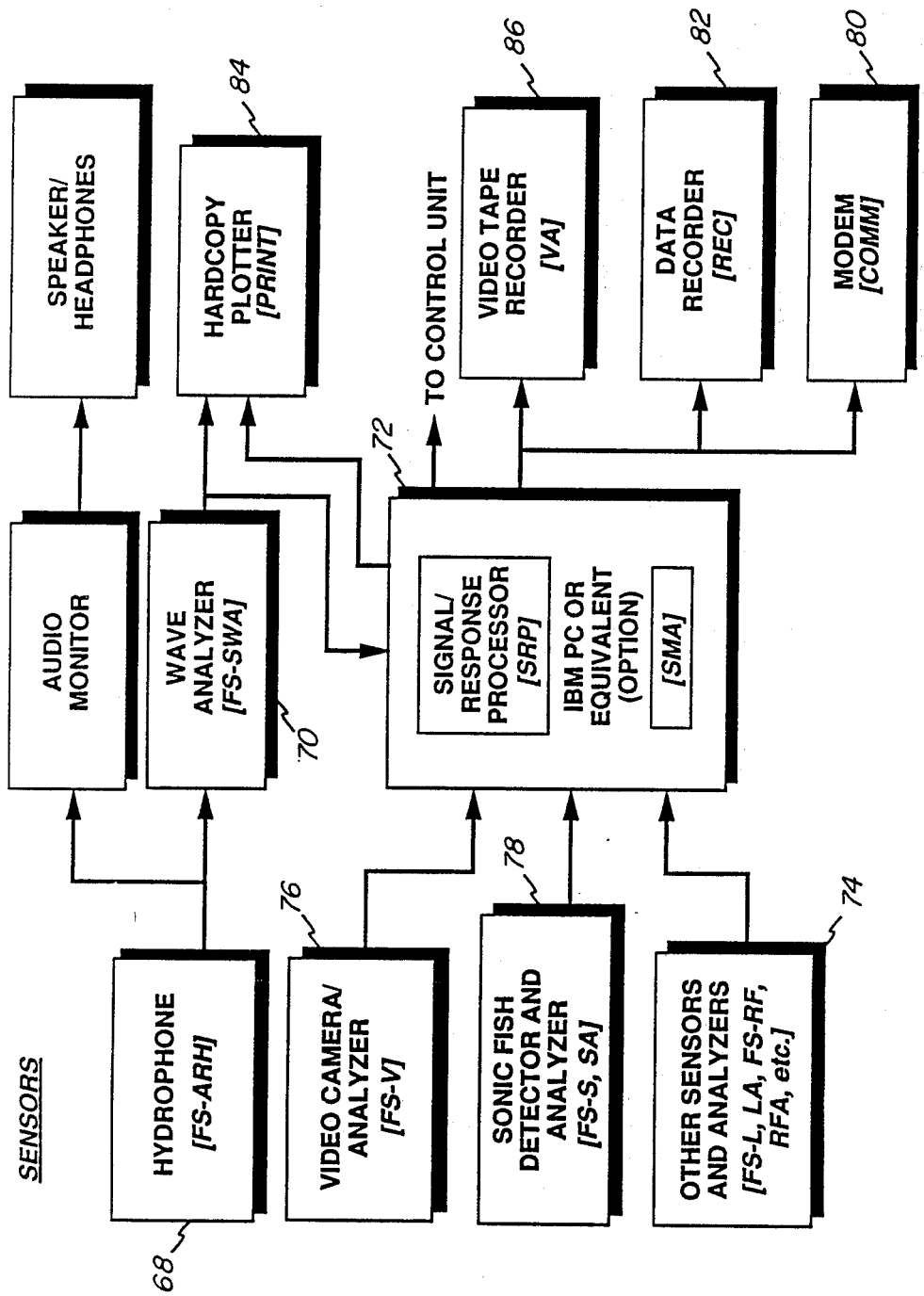
FIG. 3 is a diagrammatic illustration in detail of the feedback/monitoring section of the system; and, FIG. 4 is a flow chart of the software utilized in the system.

Turning now to FIG. 3, the feedback unit 14 consists of one or more sensors or system monitoring devices; associated power, communication, and control hardware that is required for each device; a signal/response processor; and optional recorders, hard copy production devices, or external communications devices.

An essential feedback sensor is the acoustic receive hydrophone (FS-ARH) 68 which has a sensitivity matching the frequency range of the acoustic transducer(s) 34,39. The hydrophone 68 senses the frequency and level of background noise and the levels of sound introduced in the water by the acoustic transmit components. More than one hydrophone 68 can be employed to provide adequate spatial and frequency range coverage. Moreover, in manual operation of a simple prototype configuration, the signal from the hydrophone is passed to an acoustic feedback spectral analyzer (FS-SWA) 70 (e.g., Hewlett Packard Models 3561A or 3582A) which records the detected acoustic signal and plots the time and frequency representation of the signal for the operator, who then adjusts the acoustic signal settings accordingly. In a more advanced configuration, the signal received from the hydrophone is transferred from the wave analyzer 70 to a signal/response processor (SRP) 72 which is in turn connected to the control unit 10. Processor 72 automatically compares the received signals to detected background noise levels and signal parameters residing in the control unit EPROM 26 or lookup table software. The results of the comparison are used to adjust output signals accordingly via the control unit 10, providing the present invention with an adaptive signal generation capability.

The apparatus of the present invention desirably includes adaptive capabilities using feedback sensors and analyzers that measure light or radio (FS-L, LA, FS-RF, RFA) 74, or that use video (FS-V) 76, or that use sonar (FS-S,SA) 78 signals to detect or classify fish and other marine and aquatic species. Several forms of image detection recognition, classification, and quantification capabilities exist. Richard U.S. Pat. No. 4,538,249 describes a system which uses acoustics to detect fish; others using sonic and radiofrequency devices have been described and are commercially available. Video pattern recognition and recording systems which are operable under low light conditions are also available. Sonic detectors are designed to detect the presence or absence, and the quantity of fish. Video image/pattern recognition algorithms can also identify the type of fish or animal which is present. Either method provides feedback for signal/response processor 72 and control unit 10 which initiates, modifies, or ceases signal generation.

Another type of feedback capability is incorporated into either the signal/response processor 72, the control unit EPROM 26, or the optional computer 16 to monitor the system performance of the present invention. The system monitoring algorithm (SMA) resides in computer software or EPROM: its function is to conduct self-tests and checkouts of the complete system. If a fault is found, the algorithm can interrupt the signal generation program, modify the program to bypass defective units, or call for operator/maintenance assistance via the external communications port (COMM) 80.

The optional external communications port 80 consists of a telephone modem connected to the control unit 10 and this modem can be accessed via the control unit 10 to send a maintenance assistance request. Optional recording devices connected to the feedback unit 14 can also be polled by external devices via the modem 80 to obtain an electronic copy of system operation records.

The optional data recording system (REC) 82 incorporates a magnetic, laser, or other electronic data recording device which is accessible to the feedback unit 14 or the control unit 10. This system is designed to record the results of system operation and tests, and it may exist as a dedicated unit or reside in an optional computer 16 attached to the control unit 10 as described earlier. A videotape recorder 86 may also be used to record performance.

Hard copy generating capabilities are available at PRINT by incorporating a commercially available thermal, ink, or xerographic printers or plotters 84 into the signal/response processor 72, control unit 10, or optional computer 16 attached to the control unit 10.

During site-specific engineering and installation, or during operation using a simplified set of signals, the apparatus is used in a manual mode of operation. However, once started, the unit can operate unattended to reproduce a designated set of signals.

Operation of the apparatus to generate and monitor a simple set of acoustic signals is hereafter described.

An EPROM 26 containing parameters for up to four pulse lengths and four intervals is inserted into the control unit 10 shown in FIG. 1. The components of the system shown in FIGS. 1-2 are connected and supplied with power in the standby mode. However, the optional computer and feedback circuit are not used during manual operation. To calibrate the unit, the operator sets the mode switch on the control unit 10 to the TONE position, and frequency signal generator 42 is set to the continuous mode at the desired frequency. An oscilloscope (not shown) is connected to the output of generator 42 to determine the signal frequency, pulse length, repetition, and amplitude generated in continuous and gated modes.

The unit is ready to generate signals after calibration is complete. The power amplifier 60 is switched from standby to enable, and the acoustic receive hydrophone 68 is connected to the wave analyzer 70. The hydrophone 68 is placed in the water within acoustic range of the transducer 34 to monitor actual transmissions, and the analyzer 70 is used to verify the amplitude and frequency of background noise as well as amplitude, frequency, and shape of the transmitted signal. In manual mode, the operator adapts the signal to accommodate discrepancies between the measured and predicted signals.

Signal generation begins with selection of the signal source: wideband noise generator (WNG) 46, arbitrary waveform generator (AWG) 40, single frequency A signal generator (FSG-A) 42, single frequency B signal generator (FSG-B) 44, or recorder/reproducer (R/R) 30. Single frequency sounds are generated using signal generators 42 and 44 singly or in combination. Arbitrary wave form generator 40 is used in combination with signal generator 42 to generate complex signals such as FM slides. Noise is generated by wideband noise generator 46, and pre-recorded sounds are reproduced by recorder reproducer 30. Signal characteristics can be modified using control settings on the signal generation unit components.

A transmission mode is selected using the front panel switch on the burst gate (BURST) 58. In the TRIGGER mode, a signal will be generated when the burst gate 58 receives a trigger pulse from the control unit 10 and a signal from the signal generation unit 12.

The control unit 10 also sends a trigger pulse to the selected signal generation component 12. In the case of FM slides, arbitrary wave generator 40 generates a direct current up- or down-sweep; for example, the up-sweep starts at 0 volts upon receipt of a trigger pulse and reaches the maximum DC pulse at the end of the pulse length. This DC signal is passed to the voltage controlled generator (VCG) 50 of signal generator 42, and the VCG input voltage is combined with the signal generator dial setting voltage (which determines the starting point for the up-sweep or the ending point for the down-sweep). Sine wave, square wave, and triangular wave sweeps can be produced by the arbitrary wave generator 40 and passed to signal generator 42 in this manner.

In the single frequency mode, the voltage controlled generator 50 is not used; the trigger pulse is passed directly from the control unit 10 to the either or both of the signal generators 42,44. The generated signal will reflect the dial setting of the signal generators 42,44, and the output of the generators 42 and 44 can be combined sequentially to generate two different frequencies or simultaneously to generate AM signals.

All output of the signal generators 42,44 is controllable by the control unit interface board and passed to the signal conditioning units. Output from both signal generators 42,44 is passed to amplitude modulator (AXB) 52. When wideband noise is selected, output from wideband noise generator 46 bypasses the modulator 52. Wideband noise generator 46 or the modulator 52 output can be passed directly to the clipper and output level control (CLIP) 56 or routed via shaper 54 which limits noise spectra and signal bandwidth. The output of the shaper 54 is also passed to the clipper 56, where signal power and amplitudes are limited to prevent potentially harmful current and voltage excursions from being passed to the transmission units. From clipper 56, the noise or tonal signals are passed to the burst gate 58; in triggered mode, the signal is passed to the transmission unit 18 if a trigger pulse has been received from the control unit 10. In continuous mode, the signal is immediately passed to the transmission unit 18.

Generated signals from the burst gate 58 or recorded signals from sound reproducer (R/R) 48 are amplified by the power amplifier (AMP) 60 and converted to acoustic signals by transducer (XDUCR) 34. The response to the sound by the marine or aquatic species is noted by direct visual observation, by using low light level video cameras and recorders, or by using acoustic fish detection devices Sounds may be adjusted manually to obtain the desired effect; if left unattended the unit will continue to transmit signals at intervals and pulse lengths determined by the control unit 10.

As shown in FIG. 2, noise and tones from the signal generation unit 12 can be directed from the burst gate 58 to a beamformer (BEAM) 36 which electronically separates the signals before they are sent to two or more sets of amplifiers and transducers. Separation time can be increased from zero in millisecond increments, and, by adjusting the separation time, the beam pattern of the signal can match that of a single transducer but with greater amplitude, of two transducers operating separately to offer greater coverage, or of two transducers with overlapping coverage. The result is an adjustable spatial pattern of increased or decreased signal amplitude.

As previously indicated, the apparatus may incorporate light and other types of stimuli as well as sound. For these applications, additional amplification and transmission units 67 are connected to the control unit 10 and to the burst gate 58, which control and coordinate the output of all signals. In this manner, multiple stimuli can be used to achieve the desired effect; sound can be used to repel a marine or aquatic species such as blueback herring (*Pomolobus aestivalis*) from one area while light is used to attract it, or another organism which is a potential food source the herring will follow, to another area.

As indicated, the apparatus of the present invention is capable of semiautomatic adaptive operation. One or more additional Z80 processors (not shown) are installed in the control unit 10 while the unit is in the standby mode, and the additional or replacement processors contain instructions and parameters which modify signal outputs. For example, the additional PROC capability solicits hydrophone 68 via wave analyzer 70 in the feedback and recording unit shown in FIG. 3 for sound levels within a desired frequency range between and during transmissions. The sound level between transmissions represents background noise while the sound level during transmission represents effective signal strength. The measured ratio of signal to noise levels is compared to one or more values in EPROM 26. If the measured ratio is too low, the difference is added to a baseline DC voltage value that is passed from the control unit 10 to the signal generation output level control (CLIP) 56 to increase gain. If the measured ratio is too high, the difference is subtracted from the baseline value.

The apparatus desirably includes other known sensors and processors for the purpose of altering transmitted stimuli to accommodate known and potential changes of subject marine and aquatic species responses to these stimuli due to other factors. Changes in these factors and the sensors or devices used to measure them include, but are not limited to, time of day (electronic time clock); season (electronic calendar); temperature (thermal probe); tide or water level (electromechanical level detector); incident light (photometer or nephelometer); and salinity, pH, or other chemical constituents of natural waters (conductivity or ion-specific probe).

In a fully automatic mode, the Z80 or equivalent processors are wholly or partially replaced by the processing unit of a computer as described heretofore. Through a combination of hardware and programmed algorithms (software), the computer 16 assumes the control, signal communication, and adaptive feedback functions previously described for the control unit 10.

Signal generation, output, and modification is accomplished as described under manual and semiautomatic operation with the added feature of increasing the number of types of signals, output variables, and modification parameters which are automatically available in the system. For instance, the computer memory contains lookup tables which reflect time and date-specific data for species of interest previously collected at a given installation site. For each combination of time, date, or other factors (e. g. salinity, temperature, etc.), the data is prioritized according to previously selected criteria before it is installed in the system lookup table. For example, a table may simply rank the species according to abundance, or it may be mathematically weighted to favor perceived recreational, commercial, or ecological importance of a species. A second group of lookup tables lists the combinations of stimuli which are known (through previous observation) to repel or attract each species at different times or under different conditions.

As described, a commercially available fish sensing system may be installed as a feedback device 78 to detect the presence, and even the quantity and size of particular species which are present.

Figure 4:
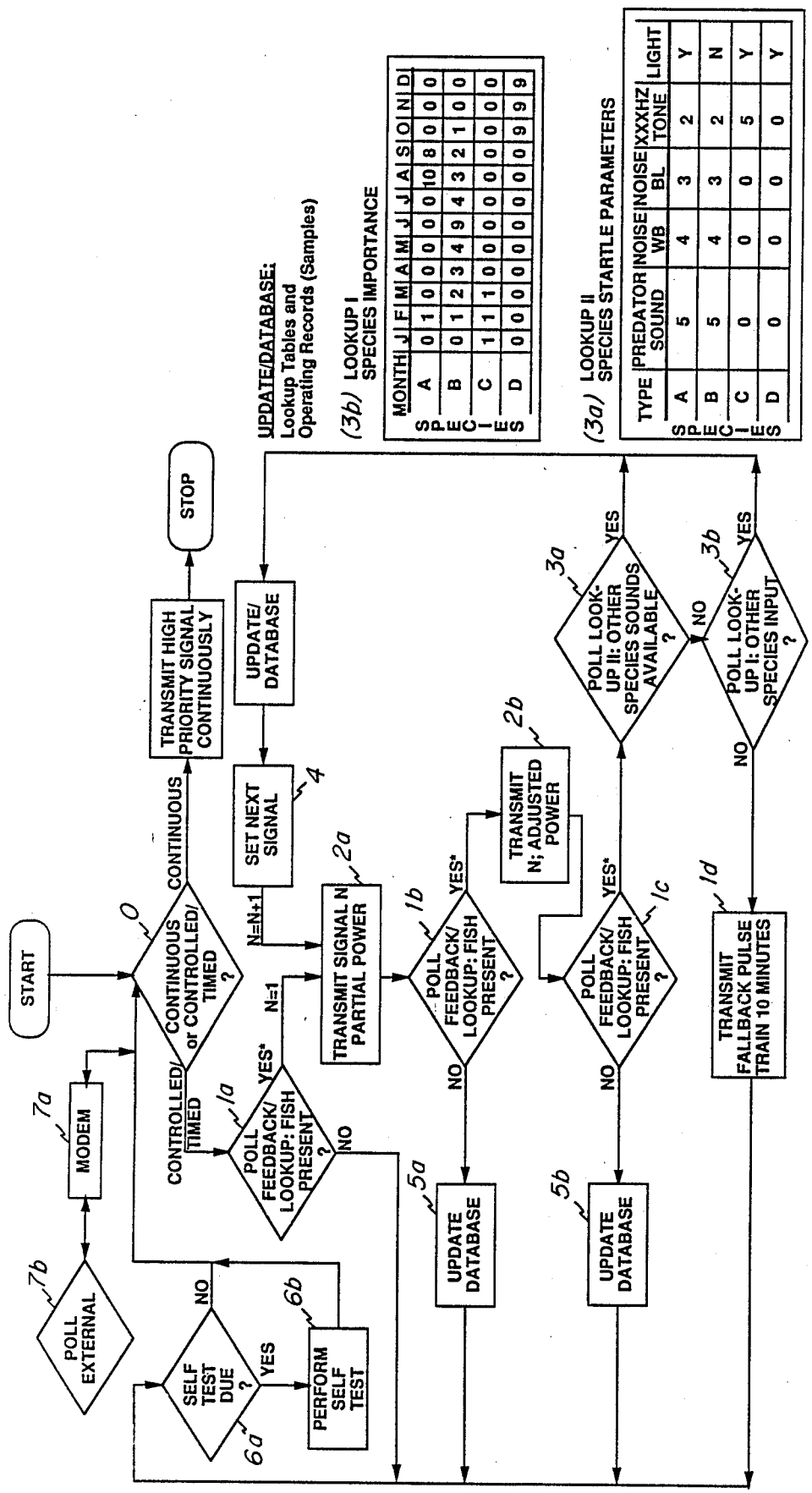

Turning now to FIG. 4, therein is set forth a logic diagram for automatic operation of the embodiment of FIGS. 1–3. Once the system is activated in the controlled/timed mode as shown at 0, the first signal is initiated by polling the feedback units and lookup tables at 1a; a poll consists of accessing input from available feedback devices and from the species importance table in Lookup Table I. A YES answer to the poll indicates that a signal n should be generated based on the observed or predicted presence of a species; a NO answer means no signal should be generated.

If the poll returns a YES, trial signal n is generated at partial power as shown at 2a. The poll is repeated as shown at 1b and, if necessary, the signal amplitude and beamforming parameters are modified and signal n is transmitted at adjusted power as shown at 2b. The poll is repeated as shown at 1c and, if necessary, a new signal is sought as indicated at 3a and 3b; the signal may be the next most effective signal for a given species as indicated in Lookup Table II. The number of repetitions for each signal is adjustable by the software. If a new signal is warranted, the system signal generation parameters are adjusted electronically to accommodate as indicated at signal 4, ($n = n+1$). The signal transmission and adaptation process is repeated until the feedback lookup poll returns a NO, indicating that the presence of a target species is below a threshold probability determined by the user.

If a NO is returned as indicated at 3b, a series of fallback pulses is transmitted as indicated at 1d for a predetermined period or until a subsequent poll indicated at 1a returns a NO. In all other cases, a resident data base indicated by the numeral 5a, 5b is updated, and the system polls a system maintenance self test indicated by the numeral 6a, 6b. If the test is required and fails, an external communications modem 7a is activated and a remote operator or system monitor 7b is notified by telephone. The modem 7a can also be accessed by a remote operator to review the data base for system operations or to enter new parameters into controlling software and lookup tables.

Based upon research to date, complex or multiple signals may have to be generated when several subject species are present in the area being controlled in order to attract or repel a majority of the species or only certain species, or to attract some species while repelling others. Thus, any system embodying the present invention must exhibit the capability of providing multiple stimuli of the same type (sonic), or of different types, to achieve its goal and flexibility for simple and rapid modification of the stimuli being used.

Moreover, any system intended to constructively exploit a stimulus must include in its design and operation consideration of the following factors:
(i) specific attributes of the various stimuli
(ii) sensitivity and response of different species to each stimulus
(iii) sensitivity and response of one species to each stimulus under different conditions
(iv) background levels of noise that can interfere with the effects of a stimulus
(v) the need to repeat, modify, or stop the stimulus
(vi) selective combination of stimuli to improve a desired effect
(vii) methods to accurately generate discrete and complex stimuli The factors for the various species are ideally determined in controlled settings by use of identifiable test populations and evaluation by competent observers. The data so generated is then incorporated in the data base used by the system.

The system of the present invention improves the performance of any known device designed to constructively modify the movement of mobile marine and aquatic species. The control unit allows the operator to manually, automatically, or adaptively generate stimuli or combinations of stimuli which will be most effective for a specific species or combination of species under changing environmental conditions within the controlled area. By the described construction, the system is capable of electronically and piezoelectrically producing acoustic signals which are of an extended range (measured in frequency and amplitude), more precise (especially with respect to frequency and duration), and more flexible (in terms of the type and complexity of signals which can be generated), than systems heretofore described in the literature.

More specifically, prototype systems embodying the present invention have been found to provide the following necessary characteristics (i) range, precision, and accuracy; (ii) components can include recent advances in signal generation and signal processing technology to synthesize, reproduce, and generate discrete or complex acoustic signals between 10 Hz and 180 kHz with a high degree of precision and fidelity; and (iii) they are capable of generating sounds in excess of 200 dB//uPa/Hz at 1 meter. Moreover, in addition to sonic devices, the system may similarly control light, radio frequency, and other signals depending on the degree of complexity and accuracy required for a particular installation. These features may be further explained as follows:

Flexibility: A practically infinite variety of sounds can be produced through the use of programmable or recorded sequences of acoustic data, and the system does not have to be redesigned or constructed for each new signal of interest. For example, discrete or complex acoustic signals composed of pulses, continuous wave (CW), broad band, narrow band, recorded sound, or any combination can be selected automatically or manually. Light and other stimuli can be similarly controlled for pulsing or continuous generation, colors, and intensity.

Adaptability: Having the ability to generate an infinite variety of sounds is of little value unless the sounds which produce the most desirable effect can be determined and produced in a reasonably short period of time. The system of the present invention is adaptive—it can be programmed to automatically poll external sensors (including receive hydrophones, fish sensing devices, thermometers, salinometers, photometers) and/or "lookup" tables (date and time specific species abundance, historical data, or species and condition specific stimulus parameters). The information from such polling is processed and the signal components—sound, light, or others—are modified if necessary to elicit a more favorable response.

Reliability: the system of the present invention is inherently more reliable than previously described mechanical and electrical devices because it employs piezoelectric transducers to convert electrical energy to acoustic energy, and it employs integrated circuit and electronically programmable technology for signal generation and control. Although the acoustic transducers used are ruggedly designed for submerged operation, they are also powerful and electronically steerable, allowing them to be mounted outside of the range of previously described transmitters. This further reduces the likelihood of substantial equipment displacement or damage which would be experienced in the previously described acoustic systems due to currents, wave action, scouring, ice, debris, or fouling.

Expandability: the system can be expanded through straight forward electrical connection and installation of additional transducers, lights, power amplifiers, beamformers, signal generators, and receive hydrophones or other feedback sensors to increase signal combinations and coverage.

Thus, the systems of the present invention may be readily adapted to use in a variety of marine environments and to control population in areas of varying size by facile placement of stimulus generators at spaced locations, and by use of combinations of stimuli. The adaptive characteristic is essential to effective automatic operation over longer periods of time and to minimize deleterious effects upon the subject species.

The applications for systems embodying the present invention are varied. Control of population near water intakes for power plants and municipal and industrial water systems is a major application. However, they may also be used to attract fish to fish ladders or to safer areas, and to divert fish and aquatic creatures from areas which are hazardous to them such as sewerage outfalls, construction sites and the like. They may also be used to repel aquatic mammals from areas where there is a high incidence of stranding, or from important migratory fish runs, or from commercial fishing nets.

Exemplary of the efficiency of the systems of the present invention are the following specific examples.

EXAMPLE ONE

A prototype system was fabricated substantially as indicated in FIG. 1, but without the automatic feedback section. Performance of the system was checked using benchtop electronic equipment and a small acoustic test tank.

A field trial of the prototype system was conducted between December 1988 and January 1989 at an abandoned New York quarry site in fresh water depths of 10 to 40 feet. Testing was conducted by generating sonic waves between 80 Hz and 5 kHz using a Honeywell SX-29 transducer capable of producing 160 dB/uPa//meter signals. Juvenile white perch (*Morone americana*), tomcod (*Microgadus tomcod*), and striped bass (*Morone saxatilis*) recently captured from wild stocks were placed in 10 ft×10 ft×25 ft cage constructed of acoustically and visually transparent plastic melting. The cage was positioned horizontally along its major axis at a depth of three feet from the top of the cage to the surface of the water with one end of the cage being located between one foot and 35 feet from the transducer.

Fish movement was observed visually and with a pair of underwater video cameras with remote video monitors and recorders. Using the video system it was possible to observe and record fish movements using ambient light without interference due to the observers. Testing at night was performed using stroboscopic red-filtered light. Controls were performed in all test configurations to accurately determine the contribution of the acoustic signals to fish movement.

The system was used to expose the fish to single frequency tones, filtered noise, unfiltered noise, AM tones, FM sweeps, and more than 30 natural and predator sounds Pulse lengths ranged from 1 millisecond to 5 seconds at intervals ranging from 100 milliseconds to continuous. The fish were also exposed to varying intensities of white light generated with four 300 watt incandescent (tungsten) floodlights suspended three feet above the water directly over the cage.

Striped bass and white perch exhibited a strong negative taxis (involuntary motion away from the source) to band limited noise and to some natural sounds. Tones, sweeps, and modulated noise elicited some negative taxis especially at frequencies near the lower limits of the transducer. Tomcod did not exhibit response to any of the sounds. Background noise levels in the quarry were approximately 67 dB//uPa/Hz; fish response was not consistently observed until sound levels reached 134 dB//uPa/m.

Separate measurements and calculations conducted at one site on the Hudson River indicated that a sound level of more than 200 dB//uPa/m would have to be attained in the sonic stimuli to achieve a similar response under conditions typically found near power generation stations and industrial water intakes where fish protection is desired.

EXAMPLE TWO

Another series of tests was conducted at a hydroelectric pump storage facility on the Savannah River in Georgia. The system was used to expose blueback herring (*Pomolobus aestivalis*) to sounds between 80 Hz to 5 kHz; a second transmission unit was used to conduct additional tests between 80 kHz and 150 kHz at nearly 200 dB//uPa/m. Low frequencies elicited some response at maximum output levels of 160 dB//uPa/M; signals between 120 and 130 kHz elicited no response at 160 dB//uPa/m but elicited a strong response at output levels approaching 200 dB//uPa/m.

Although the tests described in the preceding examples were relied upon to determine the effectiveness of stimuli, the effect of background noise, and operating parameters of the signal generators, the feedback control system and adaptive software are readily coupled to the apparatus for extended on-site population management.

Such tests are desirable to generate the data as to the species and environmental conditions at a site, and the effects of variables upon the stimuli. Thus, it can be seen from the foregoing detailed description that the systems of the present invention are effective and adaptive for controlling the population of marine and aquatic species in a limited area. The hardware and data bases may be modified readily by the site, and the components offer versatility as well as reasonably long life in frequently hostile environments Moreover, the versatility and adaptability enables the desired population control while minimizing detrimental effects upon the species being controlled.

Having thus described the invention, what is claimed is:

1. A method for controlling the population of marine and aquatic creatures in limited areas comprising:
   (a) detecting the presence of marine and aquatic creatures in the water in an area to be controlled; and
   (b) generating in the water within said area stimuli to which species of marine and aquatic creatures are responsive to affect the population of said species in said area;
   (c) dynamically monitoring the population of detected species in said area to determine the effectiveness of generated stimuli upon said species; and
   (d) varying the generated stimuli based upon the feedback from such monitoring until the desired effect is obtained upon said monitored species.

2. The population controlling method in accordance with claim 1 wherein said area is initially monitored to determine species which populate said area and the stimuli to affect such species are predetermined, and wherein at least the initial step of generating stimuli utilizes said predetermined stimuli.

3. The population controlling method in accordance with claim 1 wherein said generated stimuli cause said species to depart said area.

4. The population controlling method in accordance with claim 1 wherein said stimuli are sonic waves.

5. The population controlling method in accordance with claim 4 wherein said sonic waves comprise a combination of signals of different frequencies.

6. The population controlling method in accordance with claim 4 wherein said sonic waves are generated by multiple transducers and the intensity and direction of said waves are varied electronically.

7. The population controlling method in accordance with claim 1 wherein said step of generating stimuli produces a multiplicity of different stimuli to affect multiple species detected in the monitored area.

8. The population controlling method in accordance with claim 1 wherein there is included the step of providing a computer control containing data concerning the response of various species to stimuli, and patterns for generating stimuli to determine effectiveness, and said computer control selects the criteria for said generation of stimuli.

9. The population controlling method in accordance with claim 8 wherein new data concerning species response to generated stimuli by said monitoring is automatically added to the data stored in said computer control during operation of the method.

10. The population controlling method in accordance with claim 8 wherein said computer control may be accessed remotely to add or revise data stored therein during operation of the method.

11. Apparatus for controlling the population of marine and aquatic creatures in limited areas comprising:
   (a) means for monitoring the presence of marine and aquatic creatures in the water in an area to be controlled;
   (b) means for generating stimuli in the water in the area to affect the population of the monitored species of creatures in the area;
   (c) means for concurrently evaluating the effectiveness of the generated stimuli upon the monitored species of creatures; and
   (d) means for concurrently varying the generated stimuli until a desired effect on the population of the monitored species is obtained.

12. The population controlling apparatus of claim 11 wherein said stimuli generating means includes a plurality of transducers and drive means for generating pulses of energy to said transducers to produce sonic waves in the water and said drive means is variable electronically to vary the intensity and direction of the sonic waves.

13. The population controlling apparatus of ciaim 11 wherein said stimuli generating means includes a transducer and drive means for generating pulses of energy to said transducer to produce sonic waves in the water.

14. The population controlling apparatus of claim 13 wherein said drive means is variable to vary the frequency of the sonic waves.

15. The population controlling apparatus of claim 14 wherein said transducers are adapted to be disposed in spaced apart locations.

16. The population controlling apparatus of claim 13 wherein said stimuli generating means includes multiple transducers and multiple drive means for producing sonic waves of different frequency in the water in the area.

17. The population controlling apparatus of claim 13 wherein said apparatus includes control means for all of said previously described means, said control means including a data storage device containing stored data on multiple species of marine and aquatic creatures likely to be found in the area, and known information as to the effectiveness of various stimuli on such multiple species and as to environmental variables affecting the effectiveness of such stimuli on the species, said control means also including software for analyzing said stored data and input from said monitoring means concurrently to change automatically the generated stimuli.

18. The population controlling apparatus of claim 13 wherein there is also included sensing means for determining environmental conditions in the water in the area.

19. Apparatus for controlling the population of marine and aquatic creatures in limited areas comprising:
   (a) means for monitoring the presence of marine and aquatic creatures in the water in an area to be controlled;
   (b) means for generating stimuli in the water in the area to affect the population of the monitored species of creatures in the area;
   (c) means for concurrently evaluating the effectiveness of generated stimuli upon the monitored species of creatures; and
   (d) control means for said monitoring, stimuli generating and evaluating means, said control means including stored data with respect to species in the area and stimuli considered to affect such species, said control means being programmed to vary concurrently the generated stimuli until a desired effect on the population of the monitored species is obtained.

20. The population controlling apparatus of claim 19 wherein said stimuli generating means includes a plurality of transducers and drive means for generating pulses of energy to said transducers to produce sonic waves in the water and said drive means is variable electronically to vary the intensity and direction of the sonic waves.

21. The population controlling apparatus of claim 19 wherein said stimuli generating means includes a transducer and drive means for generating pulses of energy to said transducer to produce sonic waves in the water.

22. The population controlling apparatus of claim 21 wherein said drive means is variable to vary the frequency of the sonic waves.

23. The population controlling apparatus of claim 19 wherein said stimuli generating means includes multiple transducers and multiple drive means for producing sonic waves of different frequency in the water in the area.

24. The population controlling apparatus of claim 19 wherein said control means stored data includes environmental variables affecting various effectiveness of such stimuli on the species.

25. The population controlling apparatus of claim 24 wherein there is also included sensing means for determining environmental conditions in the water in the area.

* * * * *